Jan. 10, 1956  L. SVENDSGAARD  2,730,034
COFFEE BREWING APPARATUS
Filed Jan. 30, 1950  8 Sheets-Sheet 1

Fig.1.

INVENTOR.
LARS SVENDSGAARD
BY
ATTORNEY

Fig. 6.

Jan. 10, 1956 L. SVENDSGAARD 2,730,034
COFFEE BREWING APPARATUS
Filed Jan. 30, 1950 8 Sheets-Sheet 5

INVENTOR.
LARS SVENDSGAARD
BY
ATTORNEY

Jan. 10, 1956 L. SVENDSGAARD 2,730,034
COFFEE BREWING APPARATUS
Filed Jan. 30, 1950 8 Sheets-Sheet 8

INVENTOR.
LARS SVENDSGAARD
BY
ATTORNEY

United States Patent Office 2,730,034
Patented Jan. 10, 1956

2,730,034
COFFEE BREWING APPARATUS
Lars Svendsgaard, Berkeley, Calif.

Application January 30, 1950, Serial No. 141,260

11 Claims. (Cl. 99—283)

My invention relates to the brewing of coffee, and more particularly to apparatus for this purpose.

This application is a continuation-in-part of my application, Serial No. 90,677, filed April 30, 1949, now abandoned.

The apparatus of the present invention removes any guess work or operator responsibility in the brewing of coffee and makes it possible to produce uniformity in each individual brew.

The problems solved by the present invention are well set forth in a 48-page "Report on Coffee in Public Eating Places" published in 1948 by The Joint Committee of the Restaurant and Coffee Industries, 120 Wall Street, New York 5. It was made for this Committee by The Business Research Corporation. The report notes that:

"In 1947 approximately 2¼ billion pounds of coffee were consumed in the United States. At least 20% of this total or more than 450 million pounds were brewed and served in public and institutional eating places of all kinds. This represents a retail value of coffee sold in the cup of well over a billion dollars.

"In view of the major importance of this market to the coffee and restaurant industries and its influence on consumer eating habits, and in view of the conviction of well informed leaders of both industries that the market could be increased with improvement of coffee service to the public, it was inevitable that the Coffee and Restaurant Industries should launch a far-reaching joint program to improve the handling, service and merchandising of coffee in public and institutional eating places.

"There are three groups primarily responsible for the quality of coffee served in public eating places; the coffee industry, brewing equipment manufacturers and the restaurant industry.

"The facts revealed by the survey indicate that all three must share responsibility for the fact that the quality of coffee served in restaurants, while generally satisfactory to the public as evidenced by record levels of coffee consumption in public eating places, falls far short of a reasonable standard which is practical and readily achieved.

"As a result a three fold program was inaugurated:

"First—A survey of practices and equipment in actual use in public eating places and a study of the views of restaurant operators and of their problems and needs with respect to coffee, its brewing and service.

"Second—A program of technical scientific research to solve any unanswered problems and satisfy any unfilled needs.

"Third—An educational and development program with the coffee industry, the brewing equipment manufacturing industry and the restaurant industry to apply the results of the survey and research and to develop an improvement in conditions within the respective sphere of each, relating to the purposes of the joint program.

"The present report covers the first phase of the program."

An important feature of the present invention is that it takes the personal element out of coffee brewing because the machine controls measurements of coffee and water, temperature of brewing water, the brewing or extraction time, the separation of the finished brew from the used coffee grounds, the immediate disposition of the used grounds (making reuse impossible), and the washing of the brewing equipment in preparation for the next brewing cycle.

As pointed out in the report "With respect to the question 'Who makes the coffee in restaurants'—the answer is—everybody: porters, bus-boys, dishwashers, waitresses, pantry help, cooks, chefs, etc. There is apparently no rule by which the choice is made except convenience. One significant point in relation to this fact is that there is no uniformity and relatively little attention is given to other assigned duties of the person making the coffee—an important point because of the importance of making coffee with full attention and without interruption until the task is completed."

The present machine not only saves labor because it is completely automatic, but once the brewing cycle is initiated there is no way the operator can make a mistake. In fact the operator gives the machine no more attention until the completed brew is delivered into the brew receiver and it is desired to initiate another individual brew.

Coffee saving

Because of the minimum labor and minimum attention required in using the present invention, it becomes feasible to brew coffee more frequently and in smaller brews, with the result that the amount of coffee brewed can be gauged as the restaurant day goes along and at the close of the day there is no substantial amount of brewed coffee left on hand. In many cases, restaurant owners concerned with high labor costs have adopted the practice of brewing large quantities of coffee prior to each meal period. This has meant poorer coffee because coffee should be served soon after brewing. Also it often means left over coffee at the end of the meal period.

Danger to employees

In larger sizes of present day coffee brewing urns there is a distinct and recognized hazard to the operator or persons standing near the coffee brewer occasioned (a) by the need for the operator to pour hot water into the top of the urn over the coffee suspended in the urn bag, or (b) by the "repouring" of the coffee again into the top for it to flow through the same urn bag, or (c) by the removal of the hot and dripping urn bag after the brew is completed. These practices are eliminated with the present invention.

Another advantage of the present invention is that it provides a controlled extraction time and thereby eliminates the possible variation of drip or extraction times occurring in conventional urns employing the drip principle of coffee brewing. In the latter equipment the drip speed will vary in some degree with the fineness of the grind.

Many of the problems solved by the present invention are well set forth in the conclusions appearing on page 42 of the above-mentioned report:

1. There is universal acknowledgment of the paramount position of coffee as unchallenged beverage leader in restaurants—of its major importance in volume and profits and of its key importance for the reputation of a restaurant, for building good-will and increasing general business.

2. Nevertheless this recognition is more a matter of lip-service than a matter of acting on this premise. Restaurant operators agree "good coffee is good business" but fail generally to follow through on its implications.

3. Coffee served generally in restaurants is not as good as it can and should be. For this condition all three groups—restaurant operators, coffee men and brewing equipment manufacturers are responsible.

4. Restaurant operators are generally convinced that they are doing as good a job as possible, and hold the belief that there isn't much to know or learn about coffee brewing.

5. There is wide disparity between what management thinks is being done about coffee in the restaurant and what actually goes on in the kitchen.

6. The greatest fault of management with respect to coffee brewing is inadequate training and inadequate supervision.

7. There is serious need for improvement and modernization of coffee brewing equipment available to restaurants and for better adaptation of such equipment to the needs and practical problems of the restaurant operator.

8. Restaurant operators regularly do things in connection with coffee that is diametrically opposed to what the coffee industry knows and advises. This is partly because of inadequate education but frequently because they simply do not believe what they are told by coffee men.

9. The coffee industry has been seriously at fault in its failure to do a proper educational job with the restaurant industry and its employees.

10. Principles of proper coffee brewing must be removed from and raised above abuse by coffee companies as a competitive device, otherwise the industry will completely forfeit the confidence of its restaurant customers.

11. Further scientific research is needed on certain points of brewing procedure—as for example the effect of "repouring."

12. Restaurant operators are almost unanimously convinced that they are each selling as much coffee as possible and taking full advantage of all coffee merchandising opportunities.

Other features of the present invention are:

To provide a novel and improved coffee brewing apparatus which will automatically wash its brewing equipment after each use;

To provide a brewing chamber construction by which the brewing chamber and the filter bag may be emptied and washed while in their operative position in the machine;

To provide a novel and improved coffee brewing apparatus in which the parts, requiring periodic cleaning are accessible and may be readily cleaned or replaced as in the case of the filter bag;

To provide a novel and improved brewing apparatus having a set cycle which the operator cannot interrupt, but which can be reset only by the restaurant owner to produce brew of any desired strength;

To provide a novel and improved apparatus for brewing coffee or the like by a steeping or locked brew method.

Additional objects of my invention will be brought out in the following description of a preferred embodiment of the same taken in conjunction with the accompanying drawings wherein—

The machine as a whole

Broadly speaking the device includes a source of brewing water A maintained at a temperature approaching the boiling point; a hopper B containing a supply of ground coffee; a brewing chamber C; a measuring means D for introducing the correct amount of coffee from the hopper into the brewing chamber; means E for measuring the brewing water and spilling it into the coffee in the brewing chamber at a plurality of points; a three position valve F at the base of the brewing chamber for locking in the coffee and the water during the brewing period, for draining the finished brew into the brew receiver G, and then for opening the bottom of the brewing chamber inside and outside of the filter means H to dispose of the grounds and to wash out the brewing chamber as well as the filter means; and a timing device J for automatically moving said valve to its several positions once the brewing cycle is initiated as well as controlling all phases of the operation of the machine.

Figures 15, 16:
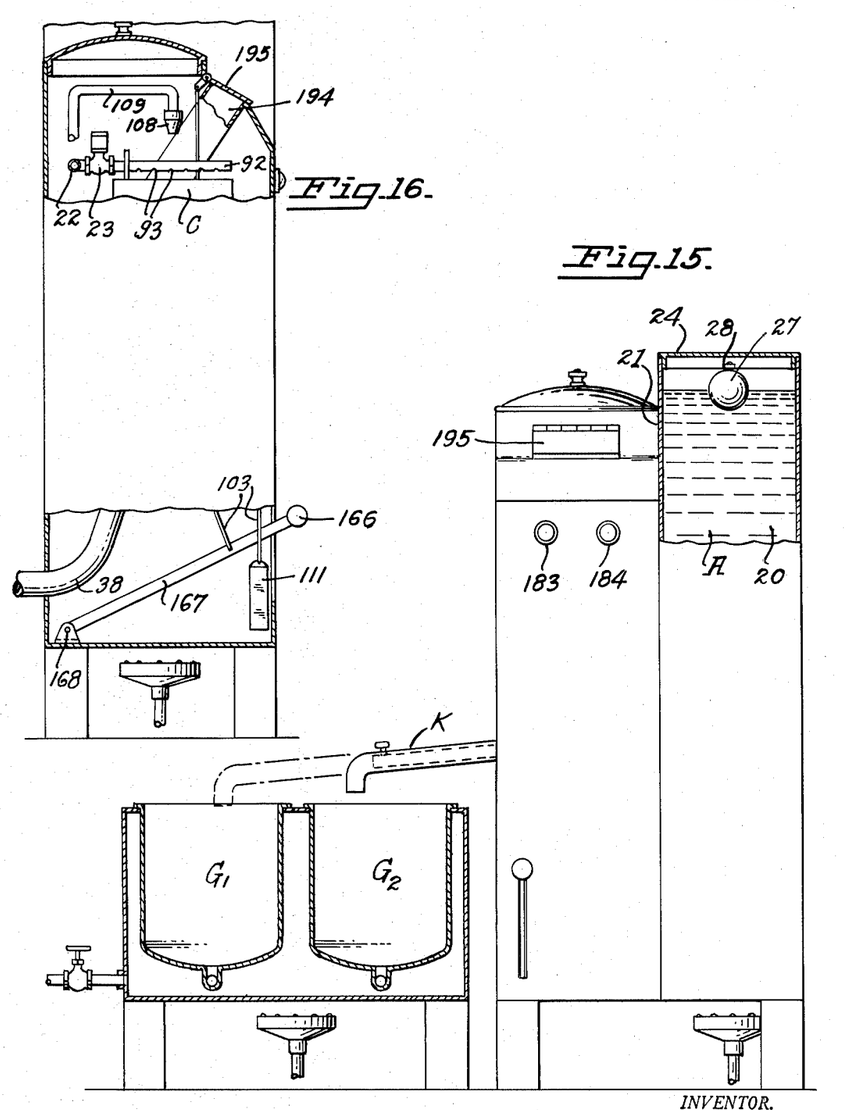
Fig. 15 is a view in front elevation, partly in section of a modified form of the device.
Fig. 16 is a view in side elevation, likewise partly in section, showing the device of Fig. 15 with the brew receiving receptacle omitted.

The machine illustrated has the various elements mounted in a single frame or housing, and is adapted to be made in a size to brew about 12 cups on each brewing cycle. It may be made larger or smaller. In a larger size, as shown in Figs. 15 and 16, where the machine is used to brew about 2½ gallons on each cycle, the hopper B and the measuring means D are eliminated inasmuch as coffee is normally packaged in 1 pound bags for restaurant use. The preferred practice is to use one pound of ground coffee to make 2½ gallons of coffee. Such a one pound bag would be poured into the brewing chamber C by the operator at the start of each brewing cycle. The portable brew receiver G on the small machine would be replaced by a pair of 3 gallon urns, preferably water jacketed, and having suitable draw-off faucets. A telescoping spout K or other diverting means would convey the finished brew from the brewing chamber C to either of the urns.

Following is a more detailed description of these devices, used here to show preferred embodiments of my invention. The small machine will be described first.

The brew water supply tank

The water heating tank 20 is secured in the frame 21 and preferably extends vertically about seven inches above the point 22 where the brew water is drawn off. The reason for having the tank extend above the point 22 is that I prefer to have a controlled head of water above this draw-off point. Thus when the brew water valve 23 is opened for a given interval of time the resultant flow of water will be the same for each brew. To facilitate this even flow of water, the tank is open at the top except for a suitable vented cover 24.

In maintaining a constant level of water in the hot water chamber, a solenoid-controlled valve 25 is inserted in the main water supply pipe 26 leading to the hot water chamber and the solenoid part of the valve is included in a float control circuit. This circuit may be of conventional design, though I have developed for this purpose a specially designed control circuit to render the circuit insensitive to ripples or equivalent fluctuations in the surface level of the water, which ripples or fluctuations in a conventional circuit would have a tendency to encourage repeated opening and closing of contacts. This would not only cause excessive sparking at the contacts with rapid deterioration thereof, but could also cause excessive wear of the valve in the water supply pipe.

In the present instance, a float 27 is connected at the end of a float arm 28 which has an extension 29 beyond its pivot point 30. Depending from this extension 29 and preferably at right angles to the float arm 28 are two arms 31 and 32. Between the two arms is rigidly mounted a two button switch 33, having a push button 34 for closing the circuit and another push button 35 for opening the circuit. The push button for closing the electrical circuit faces the float while the push button which serves to open the electrical circuit faces the other arm. A push button engaging element in the form of an adjustable bolt 36 is mounted on each arm in line with its associated push button. As thus described, any raising of the float to a desired liquid level in the hot water chamber will cause an opening of the electrical circuit to the valve solenoid, thereby de-energizing it.

The solenoid-controlled valve 25 is preferably of the type which, in the absence of electrical current flowing through the solenoid, is normally closed and this constitutes a safety factor in the operation of the coffee brewer.

The switch described above in connection with the water supply and water level control in the hot water chamber, may as an alternative, take the form of a mercury switch, in which case the respective push buttons described may be relied on to tip the mercury-containing capsule to either the on or off position as required.

The aforementioned parallel arm switch arrangement necessitates enough of a change in water level between the closing of the electrical control circuit and the opening of the same, so that ripples or equivalent surface movement do not bring the bolt 36 on the arm 32 into contact with its associated button 34. The result is an exceedingly stable control.

Any failure on the part of this switch 33 to function properly, could cause flooding. As a safeguard against this, I provide an overflow pipe 37 leading from the maximum permissible level in the hot water chamber to the waste disposal pipe 38.

The hot brew water is supplied to the brewing chamber C through a pipe connection 39 and, as previously mentioned, such pipe connection includes a solenoid controlled valve 23. This solenoid controlled valve 23 is energized during that period in the brewing cycle when the coffee has been introduced into the filter bag H. A novel feature of my invention is the utilization of another micra switch 40 to open the circuit to the solenoid controlled inlet valve 25 thus de-energizing and immobilizing the fill circuit during the time the brew water is being taken off. By keeping the fill solenoid inactive during this time I insure proper temperature for the brew water by not allowing any refill water to flow in during that period. Also this lends uniformity to the volume of water that will flow through the pipe 39 because the head of water in the tank 20 drops at a constant rate each time. The details of the micra switch circuit for de-energizing the fill circuit will be explained in a later section.

*The coffee storage hopper*

A ground coffee loading mechanism B is disposed above the brewing machine and involves a funnel 41 and a glass storage jar 42 held in place by a holding ring 43. At the lower end of the funnel is a discharge opening 44. Immediately below this discharge opening is a coffee measuring means D comprising a hollow cylindrical measuring head 45 rotatably mounted in housing 46, 47 with integral end members 48, 49 on which the head 45 is supported. The head 45 is slotted axially from end to end at 50. This slot has a flaring mouth framed by the sides 51 and 52 and a parallel walled inner cavity 53 with a movable volume plate 54 attached to a set screw 55 which passes through a bearing 56 in the head 45. By moving this plate 54 the coffee measuring cavity can be enlarged or made smaller. The housing 46 is extended to follow the form of the measuring head 45 thus keeping any vapors from entering the measuring cavity.

This coffee measuring head 45 is mounted on and keyed to the shafts 57, 58 and these are held by the bearings 59 and 60, fastened to the frame of the machine. A grooved pulley 61 is secured to the end member 48 of the measuring head and is locked to the shaft 57 by the set screw 62. The end members 48, 49 have a snug sliding fit against the housing 46, 47.

To insure that the coffee measuring head does not overtravel or go beyond its loading or its emptying position (see dotted lines in Fig. 2), I have mounted on the shaft 57 a collar 63 having two radial stop faces 64 and 65. A bracket 66, secured to the frame has an arm 67 which is engaged by one or the other of these stop faces depending upon whether the measuring head 45 is in its loading or in its emptying position.

Rotation of the measuring head 45 is effected by a flexible chain or cable 68 which is secured in the groove of the pulley 61 by an anchor post 69. One end of cable 68 is secured to a spring 70 which in turn is secured to the frame by an eye bolt 71. The other end of this cable passes over an idler pulley 72 mounted on axle 73 secured in the bracket 74 which in turn is bolted to the frame of the machine. After passing over the pulley 72 the cable is secured to one end of the bar 75.

*The brewing chamber C*

Positioned in the frame below the coffee measuring device D and below the brew water measuring means E is a brewing chamber made up of a glass jar 76 threaded into the upper end of the valve assembly F at the flange 77. A rubber gasket 78 is provided at the point of contact between the jar mouth and the flange seat to insure a leakproof joint.

A feature of my invention is the provision within this jar 76 of an independently supported filter bag or element 79, having an opening 83 adjacent the port 80 at its base, in addition to the outlet 81 of the chamber 76. As will be seen from the drawings this gives a coffee retaining element independent from the brewing chamber 76 and emptyable while still in place in the chamber. The filter element 79 is suspended in the brewing chamber 76 and may be a cloth bag or other equivalent filtering means. I prefer to use a cloth bag because it is a more effective filter, however, the device will work with other filter elements. This bag 79 is tubular and has a large opening 82 on the upper end and a smaller opening 83 at the bottom end. The bag is held in place in a novel manner by rings 84 and 85 which are split to allow the rings to be threaded into the seam pockets 86 and 87 of the bag. The upper ring 84 is held at the proper height by an arm 88 which is secured in a holder 89 where it is held in place by a set screw 90. The lower end of the bag is held in a flange or ring-like member 91 in the top of the valve housing F by the metal ring 85 which is sprung into the flange 91.

While I have shown the filter in the brewing chamber in the form of a bag, the filter may take any form so long as it is disposed between the outlets 80 and 81, thereby filtering any brew that passes through the outlet 81, and imposing no restriction to the flow of liquid or brew ingredients through the outlet 80 when the port is open.

Introducing the brew water

Before passing to a description of the valve means F, it should be pointed out that the concentric spaced apart arrangement of the chamber 76 and of the filter bag 79 gives this machine a method of operation never before known. In the first place when the coffee has been measured and emptied into the filter bag by the measurer D, the brew water is introduced over the coffee from a manifold 92 having a plurality of orifices 93. These orifices are so spaced that the streams of brew waterflowing from them will strike the coffee at close enough intervals to effect sufficient turbulence to produce a rapid and complete saturation of all dry coffee in the filter bag.

To regulate the speed with which the brew water flows into the manifold 92 any form of valve may be used. The one shown for purposes of illustration at E includes an adjustable set screw 94 threaded into the end of the pipe 39. As the set screw is screwed in it pushes a valve member 95 which closes down the size of the orifice 96 leading to the manifold 92. If it is screwed out it opens the orifice. By means of this regulation the operator can control the amount of water that flows into the brewing chamber in any given time period.

The three position valve F

Inside the valve housing F is a cylindrical valve 97 held in place by valve housing end plates 98 and 99 which are threaded to the valve housing. Extending through the end plate 98 is the valve shaft 100 shaped to receive a pulley 101 having a key portion to match a like key portion on the shaft 100 in such a manner as to assure that the pulley 101 and the valve core 97 will always be in the same relationship to each other. The end of the valve shaft 100 is threaded to receive a lock nut 102 which holds the pulley in position. The pulley 101 is grooved to receive a flexible chain or cable 103 which is secured to an anchor post 104 in the groove of the pulley.

The valve 97 is provided with a diametrical passageway 105 intermediate its ends. This passageway is flared along its upper portion an amount sufficient to span at one time the openings 80 and 81 in the valve housing. (See Fig. 2.) The valve 97 is adapted to assume three different operating positions, first, the shut-off position of Fig. 4; second, the brew drain position of Fig. 3 in which the orifice 81 of the valve housing aligns with the outlet 106 over the finished brew receiver G; and third, the ground disposal and rinse position of Fig. 2 where the passage 105 is aligned with both the orifice 81 and used-ground disposal orifice 80 on the top side and with a discharge passage 107 which connects with a waste pipe 38 leading out of the brewing apparatus through the bottom thereof. Instead of a rotating type of valve any equivalent valve mechanism may be used which will close the two ports during the brewing period, open the brew drain port at the end of the brew period, and open the brewing chamber for the rinse period.

Used grounds disposal

At this point I might refer briefly again to the spaced apart concentrically arranged brewing chamber 76 and filter bag 79 because of the importance of this construction in disposing of the coffee grounds and the washing of the brewing chamber and of the filter bag after each brew is completed. A nozzle 108 on the end of the conduit 109 is positioned above the open end of the brewing chamber so that during the ground disposal and wash or rinse period a fine driving spray of water is directed both within the filter bag and into the space between the bag and the walls of the brewing chamber (see Fig. 2). A solenoid 109a controls the valve 109b in the conduit 109 and the solenoid is adapted to be energized at the right time in the brewing cycle by means of the timing mechanism J. In this construction the open bottom end of the filter bag is important. By means of it the used-grounds are removed while the bag remains in position.

Actuation of the valve F

The valve 97 is moved into its three positions by the chain or cable 103 which, as noted before, is secured to the pulley 101 from whence it is passed from the lower side of the pulley 101 over the idler pulley 110 and is then secured to a weight 111 of sufficient size to insure by gravity the proper movement of the valve upon release of the several control stops.

The upper end of the cable 103 is wrapped completely around the grooved pulley 112 and is then secured to the pivoted bar 113. The cable is fastened to the pulley 112 by a set screw 114 so there is no slippage. The pulley 112 is mounted on an axle 115 journaled in the frame member 116. This pulley 112 has a ratchet 117 which is engaged by the pawls 118 or 119 on the valve control arm 120. A stop 121 is engaged by the ratchet 117 when it has gone beyond the pawl 119. The valve control arm 120 is journaled at 122 in the frame member 116. The other end of the control arm 120 has pivoted to it a link 123 which in turn is pivoted to the solenoid core 124 of the solenoid 125. This solenoid is fastened to the frame of the machine.

The automatic timing mechanism

To control the timing of the machine, I have installed a synchronous timer J which consists of a small synchronous motor 126 geared down to the proper time cycle through gear reduction box 127 and with an extending shaft 128 upon which four operating cams are shown.

In the machine shown, I have used a motor which is geared to give one revolution of the shaft 128 every five minutes or 300 seconds. The division of this time to the several steps in the automatic brewing cycle is shown diagrammatically in Fig. 10 and will be explained in more detail under the heating "Operation of the machine."

(a) *The brew water control cam.*—On the shaft 128 are the four cams previously mentioned. Cam 129 does two things. It controls the supply of brew water to the brewing chamber C by means of the micra switch 40, having the actuating arm 130 which is lifted by the rise 131 on the cam 129 during the period the brew water control valve 23 is open. The circuit to the valve 23 is from the leads 134, 135, 138, 139, through the switch 40. The cam 129 also controls the water tank refill circuit, as explained in the earlier section on The brew water supply tank, because it is preferred that no water shall be allowed to enter the heating tank A while hot water is being drawn off into the brewing chamber C. The micra switch 40 has the lead 132 secured to one of its contact points 133. When the arm 130 is riding on the low face of the cam 129 the contacts in the micra switch 40 will close the circuit from the main line leads 134, 135 to the leads 138, 132, 136, 137, so that when the float 27 closes the contacts 34 of the micra switch 33 the feed water valve 25 will be opened and will stay open until the float 27 breaks the contacts of the micra switch 33. By means of the micra switch 40, the contact points 133 will open when the arm 130 is on the high face of the cam 129. The opening of the contact points 133 effects a break in the circuit 134, 135, 138, 132, 136, 137, to the feed water control valve 25 so that it is immobilized in its closed position until all the brew water desired has been drawn off the tank A.

Figure 1:
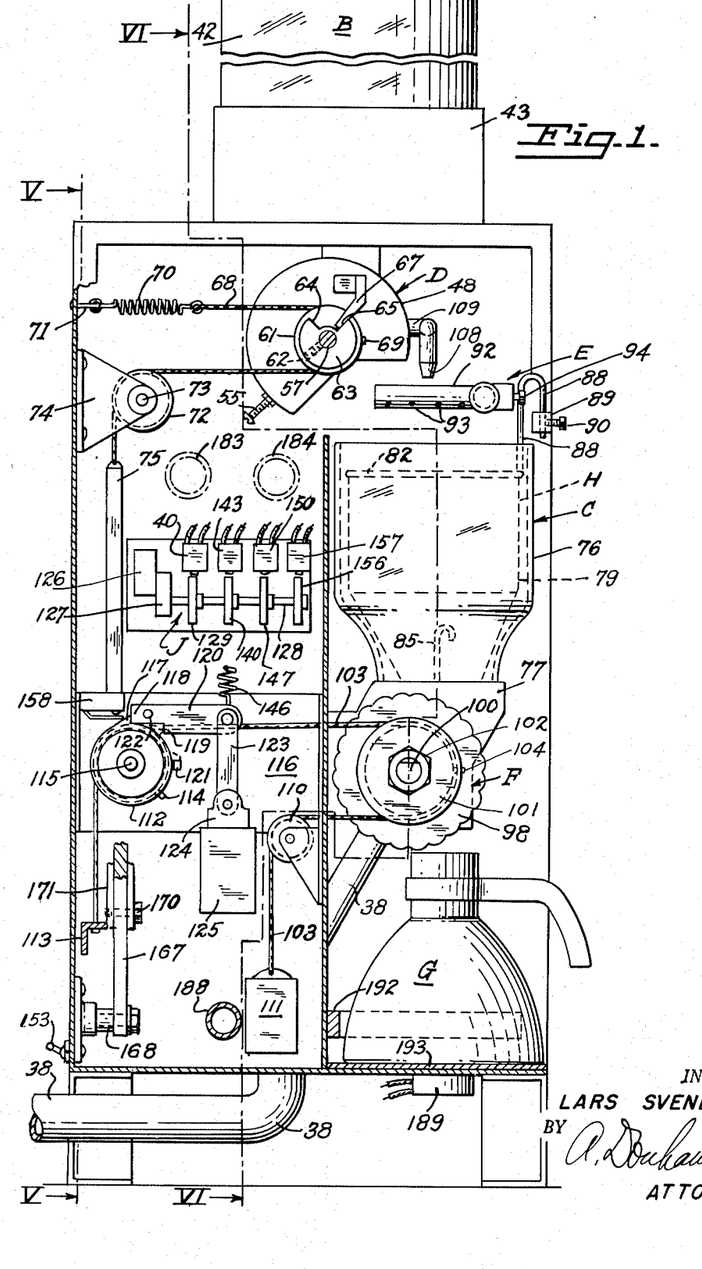
Fig. 1 is a view of the machine in front elevation taken along the line I—I in Fig. 5.
Figures 2, 3, 4, 7:
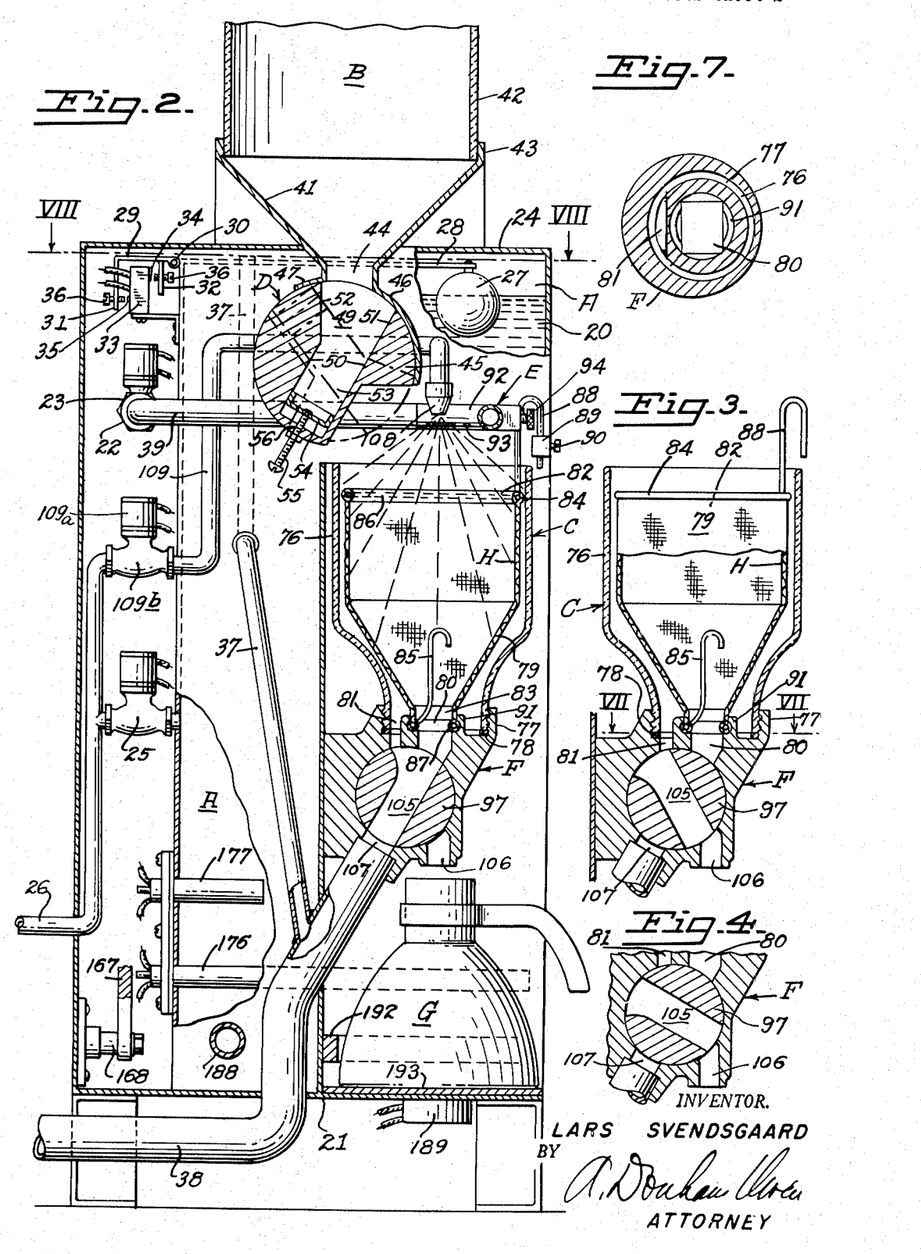
Fig. 2 is a similar view taken along the line II—II in Fig. 6 with portions cut away to show the heating elements and the thermostat in the hot water tank, and the float in said tank; and showing the valve in its used-grounds disposal and rinse position.
Fig. 3 is a view in section of the brewing chamber and valve with the latter in its brew drain position.
Fig. 4 is a sectional view of the valve assembly with the valve in its closed position for the brewing portion of the cycle.
Fig. 7 is a plan view taken on the line VII—VII in Fig. 3 at the base of the brewing chamber with the filter bag removed showing the outlets to the valve assembly.
Figure 5:
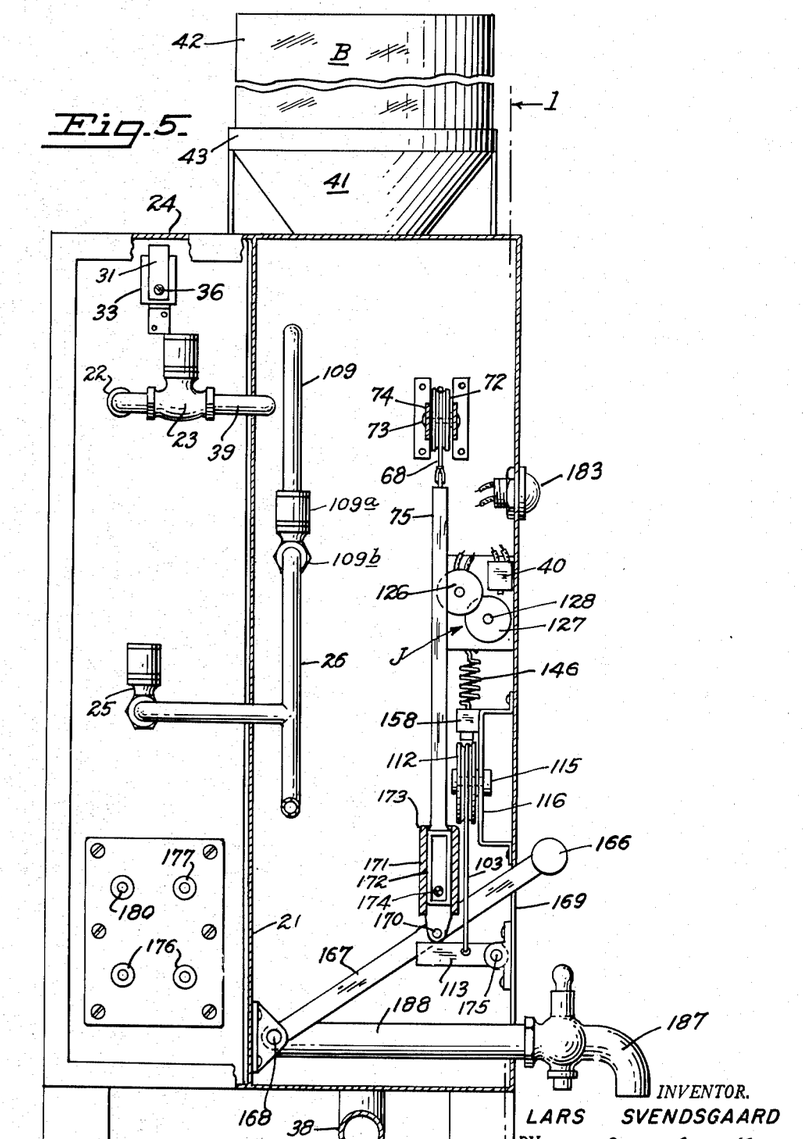
Fig. 5 is a side view of the machine taken on the line V—V of Fig. 1 showing the parts close to where the section is taken and with the parts beyond omitted for the sake of clarity and because these parts are all shown in Fig. 6.
Figure 6:
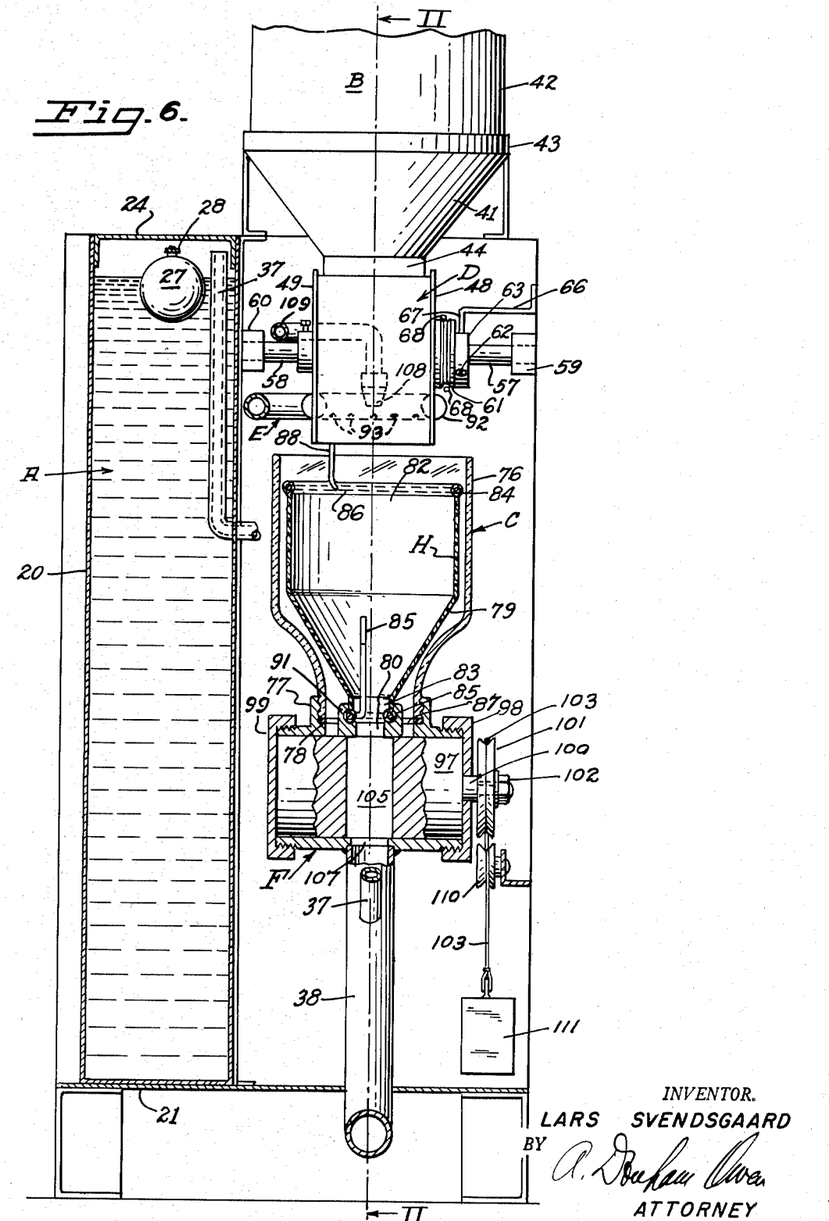
Fig. 6 is a similar side view partly in section taken on the line VI—VI in Fig. 1.
Figure 8:
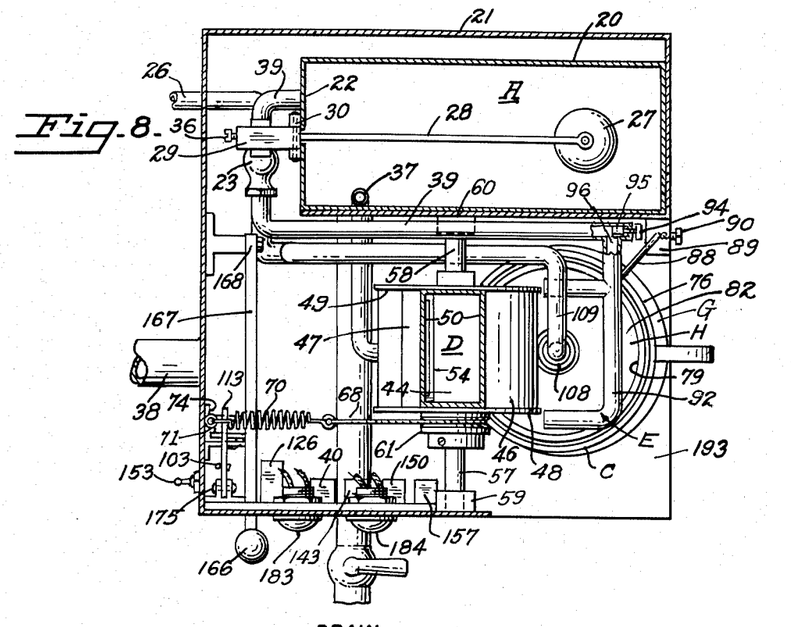
Fig. 8 is a plan view in section taken on the line VIII—VIII in Fig. 2.
Figure 9:
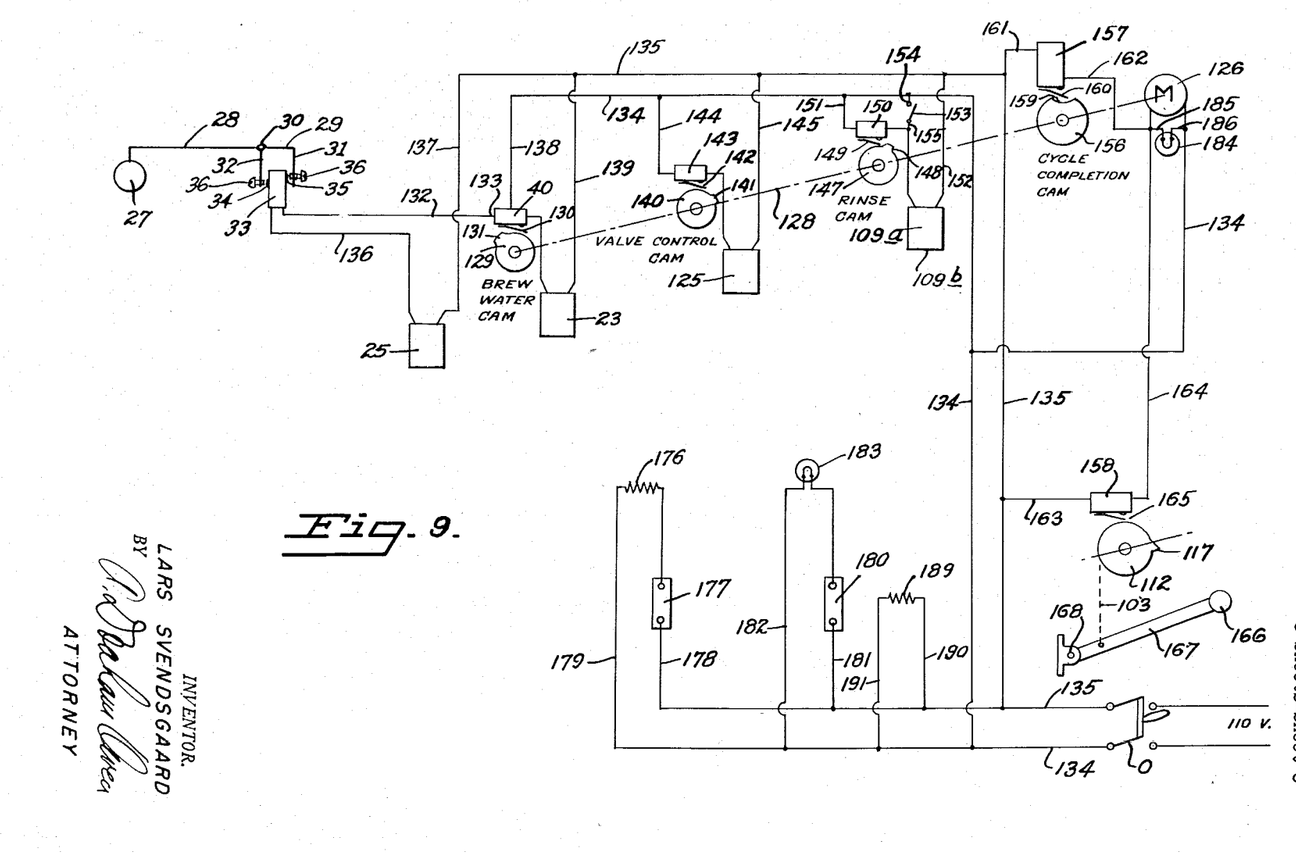
Fig. 9 is a diagrammatic view of the electrical circuits and their actuating means.

(b) *The valve control.*—The cam 140 has a high face 141 which engages the arm 142 on the micra switch 143 and when so engaged the switch closes the contacts on the leads 144 and 145 so as to energize the solenoid 125. When the solenoid 125 pulls the arm 123 it lifts the pawl 118 and allows the weight 111 (or equivalent) to rotate the valve F into its brew drain position (Fig. 3). When the arm 142 comes down off the high face 141 it breaks the circuit to the solenoid 125 and the spring 146 lifts the arm 123 and disengages the pawl 119 from the ratchet 117 so that the weight 111 will rotate the valve F into its rinse and used-grounds disposal position (Fig. 2).

(c) *The rinse control cam.*—The cam 147 controls the rinse water valve 109b and has a high face 148 which engages the arm 149 on the micra switch 150 to close the contacts on the leads 151 and 152 so as to energize the solenoid 109a. This valve is held open long enough to flush out all the used coffee grounds and to rinse thoroughly the brewing chamber C and the filter bag H.

There are times, for example, when the bag H is removed, that it is desirable to flush out the brewing chamber C without going through the complete cycle and to accomplish this I provide a manually actuated switch 153 connected to close or to open contacts on the leads 154 and 155 shunted around the micra switch 150, thereby completing the circuit 152, 154, 155.

(d) *The cycle completion cam.*—The cycle completion cam 156 takes control of the synchronous motor 126 through the micra switch 157 after the lever 165 on the starting switch 158 has been engaged by the ratchet 117 when the operator pulled down on the handle 166 to initiate a brewing cycle.

The cam 156 has a low spot 159 into which the switch actuating arm 160 will drop at the completion of the operating cycle. When the arm 160 drops into the low spot 159 it opens the contacts in the switch 157 and breaks the circuit through the motor leads 161 and 162. The manual switch 158 originally closed the motor leads 163 and 164. The gap at the low spot 159 wants to be wide enough so that at the end of a cycle the deceleration of the motor will not carry the high spot on the cam into contact with the arm 160. The lifting of the arm 160 by the cam 156 must take place at least before the cam 140 closes the circuit to the brew drain solenoid 125. Up to that time the ratchet 117 on the pulley 112 holds the arm 165 in a lifted position (thereby closing the motor circuit 163, 164 through the switch 158), but when the pawl 118 is lifted clear of the ratchet 117 by the solenoid 125 so the pulley 112 will rotate the motor circuit 162, 161, must have been closed by the switch 157.

The starting lever

The initiation of the timing cycle is effected by the operator taking hold of the handle 166 on the lever 167 which is pivoted at 168 inside the frame 21. The lever 167 moves vertically in a slot 169 in the housing. Pivoted to the lever by the pin 170 is a hollow link 171 having a slot 172 which extends vertically. Into the open upper end 173 of the hollow link 171 extends the rod 75 which has a cross pin 174 in its lower end slidably locking the rod 75 in the slot 172. This provides a lost-motion connection between the activating lever 167 and the bar 75.

The link 113 is pivotally mounted in the frame at 175 to one side of the lever 167 but close enough to it to be engaged by the end of the pin 170 so that upon the initial downward movement of the lever 167 the pin 170 moves the link 113 a considerable distance before the lever 167 has carried the hollow link 171 downwardly far enough for the cross pin 174 to engage the end of the slot 172.

The slot 172 in the hollow link 171 is placed there to delay the action of the coffee measuring element D long enough for the valve F to be rotated at least into its position where the opening 80 is closed (Fig. 3) to insure that ground coffee does not enter the brewing container C too soon and thus be lost through the ground disposal opening. In the machine shown in Figs. 15 and 16 the coffee measuring element D is omitted and therefore this lost motion connection is not required.

The further downward movement of the handle 166 does these things. It rotates the coffee measuring device D into emptying position. It rotates the pulley 112 far enough to engage the ratchet 117 under the pawl 118 which is spring pressed by the spring 146. The top side of the ratchet 117 also engages the motor switch arm 165 which starts the timing motor mechanism J. From this point on the timing cams control the cycle and the operator should release the handle 166 so that the spring 70 can return the coffee measuring valve to its fill position before any brewing vapors have entered the measuring pocket.

Auxiliary devices

*Heating the water.*—Water for brewing purposes is obtainable from the hot water chamber A. Such water is heated, preferably by an electrical immersion heating element 176, although gas may be employed for this purpose. The water is brought to a temperature approaching that of boiling, since water, to make good coffee, should be held within a temperature range of roughly 185 to 210 degrees F., though I prefer to operate within a narrower range of 200 to 210 degrees F.

To assure that the water supply to the brewing chamber C shall be of the proper temperature, a thermostat 177 is mounted in the wall of the hot water chamber and extends into the water chamber. It is connected in circuit with the hot water heating element 176 and is adapted to open the circuit 134, 135, 178, 179 when the temperature of the hot water has reached the maximum limit of the temperature range within which it is contemplated that the water may be employed for brewing purposes. This thermostat 177 cuts back in only slightly below the maximum temperature range and connects the heater element back into the circuit and thereby supplies the heat necessary to bring the temperature of the hot water back up to the maximum limit value.

*Warning light.*—To warn the operator that the temperature of the water in the water heating chamber is below that considered proper for the brewing of coffee, I have mounted a second thermostat 180 in the wall of the hot water chamber where it extends into the water. This thermostat will be set to close the electrical circuit 181, 182 at about ten to fifteen degrees below the low setting on the thermostat 177. The thermostat 180 thus controls the pilot light 183 which is provided with a red warning glass. Thus at any time that temperature of the water is below that considered proper for brewing purposes the red light will be on.

*Operating cycle indicator.*—As an indication to the operator that a brewing cycle is under way a white, or other colored signal may be provided by means of a pilot light 184 which is in a circuit 185, 186 shunted around the motor 126.

Hot water may be drawn from the hot water compartment through a faucet 187 connected to the water heating chamber by the pipe 188. This gives the operator a source of hot water for the preparation of tea, hot chocolate, or other hot drinks.

To keep the finished brew in the container G at a proper temperature, an electric heating element 189 may be provided under the base plate 193 connected in the electrical circuit by the leads 190, 191.

To facilitate the easy placing of the brew receiver G, and to make certain that it will be positioned directly under the brew discharge spout 106, I have secured a semi-circular guide member 192 to the frame of the machine.

Operation of the machine

When the operator wishes to brew coffee he makes certain that a brew receiver G is in position and he also checks to see that the hot water pilot light signal 183 and the operating cycle light 184 are not lit, and then he presses down a full stroke on the starting lever handle 166.

When the operator depresses this starting lever 167 the lost-motion connection permits it to engage the link 113 which moves the valve F to its partially closed position (Fig. 3). The further movement of the lever 167 will rotate the coffee measuring means D to empty the ground coffee into the filter bag H and will rotate the pulley 112 so that the ratchet 117 will lock behind the pawl 118 and will lift the arm 165 on the switch 158 to start the timing motor 126 and the rotation of the control cams 129, 140, 147, and 156. From this point on the operation is automatic. As shown by the diagrammatic cycle chart (Fig. 10) the first phase is for the brew water to flow over the ground coffee in the brewing chamber C, and the brewing of the coffee begins. The amount of water admitted to the brewing chamber is regulated (a) by the time that the cam 129 keeps the valve 23 open, and (b) by the adjustment of the plug 95 in the manifold 92.

The brewing or steeping of the coffee continues for a controlled period under the influence of the cam 140. At the end of the brewing time the cam 140 closes the micra switch 143 thereby energizing the solenoid 125 which pulls down on the link 123 thereby lifting the pawl 118 from the ratchet 117 on the pulley 112. The latter then is rotated by the weight 111 by means of the cable 103 until the ratchet 117 engages the pawl 119. This effected a rotation of the valve F into its brew drain position (Fig. 3), at which time the finished brew flows through the valve orifices 81, 106 into the brew receiver G. Meanwhile all the used coffee grounds are held within the filter bag H for later disposal.

After sufficient time has elapsed to allow the brew to drain from the screen or bag into the brew receiver, the solenoid 125 is de-energized and the spring 146 lifts the pawl 119 away from the ratchet 117 allowing the weight 111 to rotate the pulley until the ratchet comes against the stop 121. This will have rotated the valve F into its third or wash position (Fig. 2).

Immediately, or shortly thereafter, depending upon the brew time allowed, the cam 147 will close the micra switch 150 to energize the solenoid 109a to open the valve 109b. This valve is connected through the pipe 109 with the city water pressure line 26 and supplies water through the pipe 109 to the shower head 108. This shower head is set so as to furnish a powerful diffused spray of water into the brewing chamber so that the spray strikes both within the filter bag H and above the bag against the sides of the brewing chamber C, thus washing the entire brewing chamber and filter bag free of all coffee grounds and remaining coffee oils. These pass through the valve orifices 80 and 81 and out through the orifice 107 into the disposal pipe 38. The period of this rinse is controlled by the high spot on the cam 147. When the micra switch 150 opens the circuit and de-energizes the solenoid 109a the rinse water will be shut off, but the valve F will remain open to allow the parts to drain.

Preferably the completion cam 156 will still have a few seconds remaining in which the motor control is running and the operating light 184 is lit so that the parts will drain thoroughly before the operator initiates another cycle.

Figure 10:
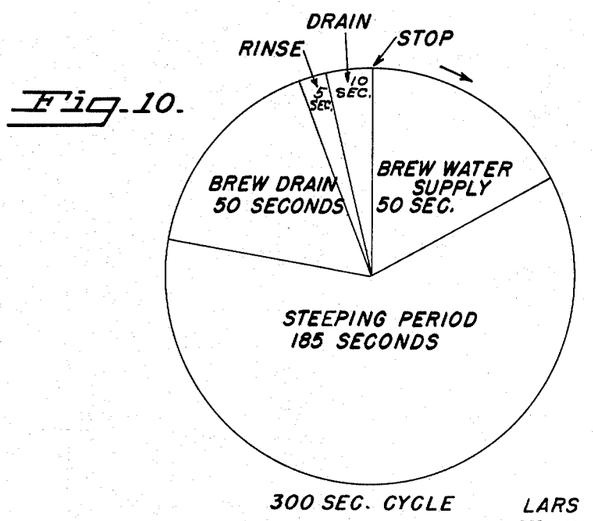
Fig. 10 is a diagrammatic view depicting the time cycle of the device.
Figure 11:
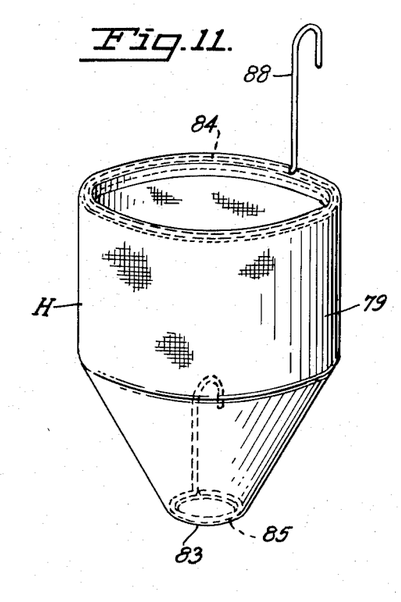
Fig. 11 is an elevation view in perspective showing one form of filter bag and its attaching means.
Figure 12:
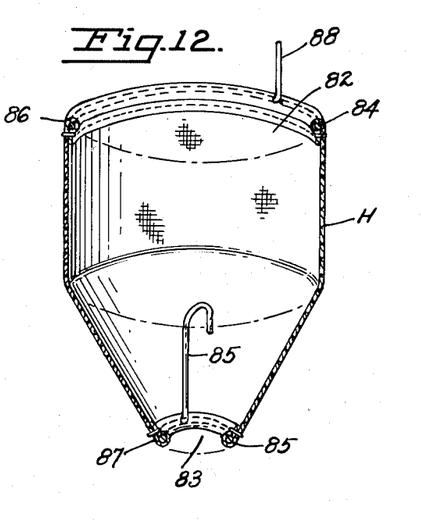
Fig. 12 is a similar view with the parts shown in section.
Figure 13:
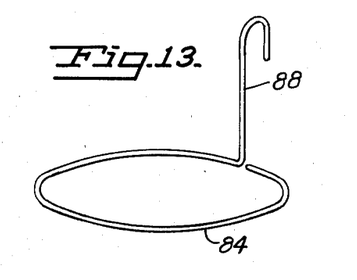
Fig. 13 is a view in perspective showing the upper mounting ring removed from the upper pocket seam in the filter bag.
Figure 14:
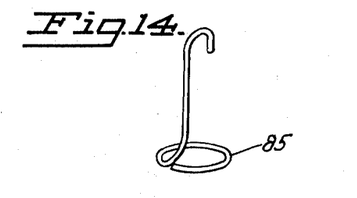
Fig. 14 is a similar view of the lower mounting ring.

The cams 129, 140, 147 and 156 are so positioned on the cam shaft of the synchronous timer J as to provide proper sequence of operation of the various components controlled thereby, so as to produce an operating cycle having a program of operation indicated in Fig. 10 of the drawing.

For purposes of illustration, I have used a motor 126 geared so that the shaft 128 makes one revolution in five minutes or 300 seconds. Assuming that the operator desires the longest brew or steeping period possible in a five minute completion cycle, the cam 129 will be set with its high spot 131 to engage the switch arm 130 immediately after the lever 167 is pushed downward. The brew water then begins to flow into the brewing chamber C over the coffee emptied into the filter bag H by the depressing of the starting lever. This water flow or dribble will continue for about 50 seconds. The completion cam 156 takes over during this period and will keep the motor 126 rotating during the brewing and to the end of the cycle.

The brewing or steeping is set in this illustrative device to consume another 185 seconds. At the end of that time the high spot 141 on the cam 140 engages the switch arm 142 of micra switch 143 for about 50 seconds while the brew drains into the brew receiver G. At the end of that time the switch arm 142 passes off the high spot 141 and the solenoid 125 is de-energized so the valve F is moved to the rinse or wash position. Then the cam 147 energizes the solenoid 109a and the rinse action begins and continues for 5 seconds. At the end of the 5 second rinse action, there is a continued dwell of the switch arm 160 on the completion cam 156 for ten more seconds to allow draining off of the wash water. Then the switch arm 160 falls into the low spot of the cam 156 and the cycle is completed. The machine is then ready for the operator to initiate another cycle.

It is of course understood that a main line switch O will be installed in the main line 134, 135 to de-energize the entire system when the coffee brewer is closed down for the day or during long inactive periods.

The device of Figs. 15 and 16

This larger form of the machine is in general of the same construction as the smaller machine just described. To avoid needless repetition, like reference numerals have been applied and I shall describe only the principal differences in the two machines.

Starting at the top in Figs. 15 and 16, the coffee storage jar 42 and ground coffee measuring head 45 of the smaller machine can be omitted where as here the brewing chamber is made in a size to brew at one time about 2½ gallons of coffee, the amount generally considered proper to be made from one pound of ground coffee.

In place of the storage jar and measuring head I show a funnel 194 covered by a small door 195. By lifting the door the operator can easily pour the contents of a one pound sack of ground coffee into the funnel 194 from which it falls directly into the brewing chamber C. The operator then closes the door. The cycle of the machine is the same as that already described for the smaller machine.

When the brew period ends, the 2½ gallons of finished brew will flow down the telescoping spout K and into one of the urns G1 or G2, which replaces the smaller brew receiver G in the other machine.

As already pointed out the lever 167 does not require the lost motion connection of the smaller machine because that is only of use where there is a coffee measuring mechanism D.

While for purposes of compliance with the statute I have explained in detail one embodiment as illustrative of my invention, I do not thereby intend to limit the invention to such details for in actual manufacture details may be varied to suit individual conditions and tastes.

I claim:

1. In a completely automatic coffee brewing machine the combination of: a container for dry ground coffee; means for measuring out a predetermined quantity of said coffee; a source of heated brew water; means for flowing out a predetermined quantity of said hot brew water; a second source of water under pressure for rinsing; a spray member connected to said source of rinse water; an open topped brewing chamber positioned directly below said spray member and having a brew discharge port and a used grounds disposal port at its bottom; a fabric filter member having an open top and an open bottom, with its open top secured near the top edge of said brewing chamber and with its open bottom edge secured to said grounds disposal port; a valve housing secured to said brew discharge port and to said used grounds disposal port, said valve housing having a brew outlet conduit and a rinse outlet conduit; valve means in said housing having a passageway therein which when the valve means is in closed position seals off said outlet conduits from said brewing chamber outlets and when the valve means is in intermediate brew drain position the brew discharge port is aligned with the brew outlet conduit and when the valve member is in its grounds disposal rinse position the brew discharge port and the grounds disposal port are both aligned with the rinse outlet conduit; a source of electric current; a motor actuated timing mechanism; a normally open circuit from said source to said motor; a manually operable means for closing said circuit to energize said motor and for moving said valve member into closed position and for moving said coffee measuring means into position to drop a charge of dry ground coffee into said brewing chamber; means urging return of said valve member to its intermediate brew-drain position and to its grounds disposal rinse position; latch means for holding said valve in its closed and then in its intermediate positions; a holding circuit for maintaining said motor circuit closed during a full cycle of said timing mechanism; means actuated by said timing mechanism for introducing a measured quantity of hot brew water into said brewing chamber upon initiation of the brewing cycle, means actuated by said timing mechanism after said hot brew water has been in said brewing chamber for a predetermined time, for moving said valve latch means whereby said urging means will move said valve member to its intermediate brew-drain position at which time the brewed coffee will drain out of said brewing chamber through said brew discharge port and said brew outlet conduit; means actuated by said timing mechanism after said brew has drained for releasing said valve latch means whereby said urging means will move said valve to its grounds disposal rinse position; and means actuated by said timing mechanism for introducing rinse water to said spray member after said valve is in its grounds disposal rinse position; and for opening said normally open electric circuit upon completion of the rinse time.

2. In a completely automatic coffee brewing machine the combination of: a container for dry ground coffee; means for measuring out a predetermined quantity of said coffee; a source of heated brew water; means for flowing out a predetermined quantity of said hot brew water; a second source of water under pressure for rinsing; a spray member connected to said source of rinse water; an open topped brewing chamber positioned directly below said spray member and having a brew discharge port and a used grounds disposal port at its bottom; a fabric filter member having an open top and an open bottom, with its open top secured in said brewing chamber near its top edge and with its open bottom edge secured to said grounds disposal port; a valve housing secured to said brew discharge port and to said used grounds disposal port, said valve housing having a brew outlet conduit and a rinse outlet conduit; valve means in said housing having a passageway therein which when the valve means is in closed position seals off said outlet conduits from said brewing chamber outlets and when the valve means is in intermediate brew drain position the brew discharge port is aligned with the brew outlet conduit and when the valve member is in its grounds disposal rinse position the brew discharge port and the grounds disposal port are both aligned with the rinse outlet conduit; a source of electric current; a motor actuated timing mechanism; a normally open circuit from said source to said motor; means for closing said circuit to energize said motor and for moving said valve member into closed position and for moving said coffee measuring means into position to drop a charge of dry ground coffee into said brewing chamber; means urging return of said valve member to its intermediate brew drain position and to its grounds disposal rinse position; means for holding said valve in its closed and then in its intermediate positions; a holding circuit for maintaining said motor circuit closed during a full cycle of said timing mechanism; means actuated by said timing mechanism for introducing a measured quantity of hot brew water into said brewing chamber upon initiation of the brewing cycle; means actuated by said timing mechanism after said hot brew water has been in said brewing chamber for a predetermined time, for moving said valve holding means whereby said urging means will move said valve member to its intermediate brew drain position at which time the brewed coffee will drain out of said brewing chamber through said brew discharge port and said brew outlet conduit; means actuated by said timing mechanism after said brew has drained for releasing said valve holding means whereby said urging means will move said valve to its grounds disposal rinse position and means actuated by said timing mechanism for introducing rinse water to said spray member after said valve is in its rinse position; and for opening said normally open electric circuit upon completion of the rinse time.

3. In an automatic coffee brewing machine the combination of an open topped brewing chamber adapted to receive a charge of ground coffee and having a brew discharge port and a used grounds disposal port at its bottom; a source of heated brew water; means for flowing out a predetermined quantity of said hot brew water; a second source of water under pressure for rinsing; a spray member connected to said source of rinse water; a fabric filter member having an open top and open bottom, with its open top secured in said brewing chamber near its top edge and with its bottom edge secured to said grounds disposal port; a valve housing secured to said brew discharge port and to said used grounds disposal port, said valve housing having a brew outlet conduit and a rinse outlet conduit; valve means in said housing having a passageway therein which when the valve means is in closed position seals off said outlet conduit from said brewing chamber outlets and when the valve means is in intermediate brew drain position the brew discharge port is aligned with the brew outlet conduit and when the valve member is in its grounds disposal rinse position the brew discharge port and the grounds disposal port are both aligned with the rinse outlet conduit; a source of electric current; a motor actuated timing mechanism; a normally open circuit from said source to said motor; means for closing said circuit to energize said motor and for moving said valve member into closed position; means urging return of said valve member to its intermediate brew drain position and to its grounds disposal rinse position; means for holding said valve in its closed and then in its intermediate positions; a holding circuit for maintaining said motor circuit closed during a full cycle of said timing mechanism; means actuated by said timing mechanism for introducing a measured quantity of hot brew water into said brewing chamber upon initiation of the brewing cycle; means actuated by said timing mechanism after said hot brew water has been in said brewing chamber for a predetermined time, for moving said valve holding means whereby said urging means will move said valve member to its intermediate brew drain position at which time the brewed coffee will drain out of said brewing chamber through said brew discharge port and said brew outlet conduit; means actuated by said timing mechanism after said brew has drained for releasing said valve holding means whereby said urging means will move said valve to its grounds disposal rinse position; and means actuated by said timing mechanism for introducing rinse water to said spray member after said valve is in its rinse position; and for opening said normally open electric circuit upon completion of the rinse time.

4. In an automatic coffee brewing machine the combination of an open topped brewing chamber adapted to receive a charge of ground coffee and having a brew discharge port and a used grounds disposal port at its bottom; a source of heated brew water; means for flowing out a predetermined quantity of said hot brew water; a second source of water under pressure for rinsing; a spray member connected to said source of rinse water;

a fabric filter member having an open top and an open bottom with its open top secured near the top edge of said brewing chamber and with its open bottom edge secured to said grounds disposal port; a valve connected to said used grounds disposal port; a source of electric current; a motor actuated timing mechanism; a normally open circuit from said source to said motor; means for closing said circuit to energize said motor and for moving said valve into closed position; means for opening said valve; a holding circuit for maintaining said motor circuit closed during a full cycle of said timing mechanism; means actuated by said timing mechanism for introducing a measured quantity of hot brew water into said brewing chamber upon initiation of the brewing cycle; means actuated by said timing mechanism after said brew has drained for opening the valve at said grounds disposal port to its rinse position; means actuated by said timing mechanism for introducing rinse water to said spray member when said valve is in its rinse position; and for opening said normally open electric circuit upon completion of the rinse time.

5. In an automatic coffee brewing machine the combination of an open topped brewing chamber adapted to receive a charge of ground coffee and having a brew discharge port and a used grounds disposal port at its bottom; a source of heated brew water; means for flowing out a predetermined quantity of said hot brew water; a second source of water under pressure for rinsing; a spray member connected to said source of rinse water; a fabric filter member having an open top and an open bottom, with its open top secured near the top edge of said brewing chamber and with its open bottom edge secured to said grounds disposal port; valve means connected to said brew discharge port and to said used grounds disposal port; a source of electric current; a motor actuated timing mechanism; a normally open circuit from said source to said motor; means for closing said circuit to energize said motor and for actuating said valve means; a holding circuit for maintaining said motor circuit closed during a full cycle of said timing mechanism; means actuated by said timing mechanism for introducing a measured quantity of hot brew water into said brewing chamber upon initiation of the brewing cycle; means actuated by said timing mechanism after said hot brew water has been in said brewing chamber for a predetermined time, for opening said valve means at said brew discharge port whereby the brewed coffee will drain out of said brewing chamber; means actuated by said timing mechanism after said brew has drained for opening said valve means at said grounds disposal port; means actuated by said timing mechanism for introducing rinse water to said spray member when said last named valve means is in its open position; and for opening said normally open electric circuit upon completion of the rinse time.

6. In a completely automatic coffee brewing machine the combination of: a container for dry ground coffee; means for measuring out a predetermined quantity of said coffee; a source of heated brew water; means for flowing out a predetermined quantity of said hot brew water; a second source of water under pressure for rinsing; a spray member connected to said source of rinse water; an open topped brewing chamber positioned directly below said spray member and having a brew discharge port and a used grounds disposal port at its bottom; a fabric filter member having an open top and an open bottom, with its open top secured near the top edge of said brewing chamber and with its open bottom edge secured to said grounds disposal port; valve means connected to said brew discharge port and to said used grounds disposal port; a source of electric current; a motor actuated timing mechanism; a normally open circuit from said source to said motor; means for closing said circuit to energize said motor and for actuating said valve means and for moving said coffee measuring means into position to drop a charge of dry ground coffee into said brewing chamber; means for opening said valves; a holding circuit for maintaining said motor circuit closed during a full cycle of said timing mechanism; means actuated by said timing mechanism for introducing a measured quantity of hot brew water into said brewing chamber upon initiation of the brewing cycle; means actuated by said timing mechanism after said hot brew water has been in said brewing chamber for a predetermined time, for opening said valve means at said brew discharge port whereby the brewed coffee will drain out of said brewing chamber; means actuated by said timing mechanism after said brew has drained for opening said valve means at said grounds disposal port; means actuated by said timing mechanism for introducing rinse water to said spray member when said last named valve means is in its rinse position; and for opening said normally open electric circuit upon completion of the rinse time.

7. In a completely automatic coffee brewing machine the combination of: a container for dry ground coffee; means for measuring out a predetermined quantity of said coffee; a source of heated brew water; means for flowing out a predetermined quantity of said hot brew water; a second source of water under pressure for rinsing; a spray member connected to said source of rinse water; an open topped brewing chamber positioned directly below said spray member and having a brew discharge port and a used grounds disposal port at its bottom; a fabric filter member having an open top and an open bottom with its open top secured near the top edge of said brewing chamber and with its open bottom edge secured to said ground disposal port; a valve connected to said used grounds disposal port; a source of electric current; a motor actuated timing mechanism; a normally open circuit from said source to said motor; means for closing said circuit to energize said motor and for moving said valve into closed position and for moving said coffee measuring means into position to drop a charge of dry ground coffee into said brewing chamber; means for opening said valve; a holding circuit for maintaining said motor circuit closed during a full cycle of said timing mechanism; means actuated by said timing mechanism for introducing a measured quantity of hot brew water into said brewing chamber upon initiation of the brewing cycle; means actuated by said timing mechanism after said brew has drained for opening the valve at said grounds disposal port to its rinse position; means actuated by said timing mechanism for introducing rinse water to said spray member when said valve is in its rinse position; and for opening said normally open electric circuit upon completion of the rinse time.

8. In an automatic coffee brewing machine, the combination of an open topped brewing chamber adapted to receive a charge of ground coffee and having a brew discharge port and a used grounds disposal port at its bottom; a source of heated brew water; means for flowing out a predetermined quantity of said brew water; a source of water under pressure for rinsing; a spray member connected to said source of rinse water; a filter member having an open top and an open bottom, with its open top positioned near the top edge of said brewing chamber and with its open bottom secured adjacent to said grounds disposal port so that the interior of said filter member is in communication with said grounds disposal port through which the used grounds are emptied; valve means connected to said brew discharge port and to said used grounds disposal port; a source of electric current; a motor actuated timing mechanism; a normally open circuit from said source to said motor; means for closing said circuit to energize said motor to initiate the brewing cycle; a holding circuit for maintaining said motor circuit closed during a full cycle of said timing mechanism; means actuated by said timing mechanism for introducing a measured quantity of hot brew water into said brewing chamber during the brewing cycle;

means actuated by said timing mechanism after said hot brew water has been in said brewing chamber for a predetermined time, for opening said valve means at said brew discharge port, whereby the brewed coffee will drain out of said brewing chamber, and for closing said valve means thereafter; means actuated by said timing mechanism, after said brew drain valve has closed, for opening said valve means at said grounds disposal port; means actuated by said timing mechanism for introducing rinse water to said spray member when said last-named valve means is in its open position; means for closing said last-named valve means; and means for opening said normally open electric circuit upon completion of the time cycle.

9. In an automatic coffee brewer having an outside casing forming an inner chamber with a wide open top and a rimmed bottom opening, a self supporting filter unit comprising a fabric walled sleeve-like member having an upper generally cylindrical portion with a ring supporting member secured at the top thereof to form an upper opening therein spaced from the chamber and supported by engagement with the outside casing, and a lower frusto-conical portion having a securing member attached to the sleeve-like wall forming a lower opening for insertion in the rimmed bottom opening of the chamber.

10. In an automatic coffee brewer having an outside casing forming an inner chamber with a wide open top and a rimmed bottom opening, a filter unit comprising a fabric walled sleeve-like member having an upper generally cylindrical portion with a ring supporting member secured at the top thereof to form an upper opening therein spaced from the chamber; a lower frusto-conical portion having a securing member attached to the sleeve-like wall forming a lower opening for engagement with the rimmed bottom opening of the chamber; and means to support said ring member in operative position in relation to said chamber.

11. In an automatic coffee brewing machine, the combination of an open topped brewing chamber adapted to receive a charge of ground coffee and having a brew discharge port and a used grounds disposal port at its bottom; a source of heated brew water; means for flowing out a predetermined quantity of said brew water; a source of water under pressure for rinsing; a spray member connected to said source of rinse water; a filter member having an open top and an open bottom disposed with the open top positioned near the top edge of said brewing chamber and with the open bottom secured adjacent to said grounds disposal port so that the interior of said filter member is in communication with said grounds disposal port through which the used grounds are emptied; valve means connected to said used grounds disposal port; a source of electric current; a motor actuated timing mechanism; a normally open circuit from said source to said motor; means for closing said circuit to energize said motor to initiate the brewing cycle; a holding circuit for maintaining said motor circuit closed during a full cycle of said timing mechanism; means actuated by said timing mechanism for introducing a measured quantity of hot brew water into said brewing chamber during the brewing cycle; means actuated by said timing mechanism after said brew has drained for opening the valve at said grounds disposal port to a rinse position; means actuated by said timing mechanism for introducing rinse water to said spray member when said valve means is in its open position; means for closing said valve means; and means for opening said normally open electric circuit upon completion of the time cycle.

References Cited in the file of this patent

UNITED STATES PATENTS

| | | |
|---|---|---|
| 204,683 | Rice | June 11, 1878 |
| 291,535 | Rall | Jan. 8, 1884 |
| 944,865 | Houck | Dec. 28, 1909 |
| 959,955 | Moore | May 31, 1910 |
| 1,059,781 | Stephen | Apr. 22, 1913 |
| 1,092,538 | Rauch | Apr. 7, 1914 |
| 1,145,221 | Tobriner | July 6, 1915 |
| 1,339,195 | Grover | May 4, 1920 |
| 1,382,056 | Bontemps et al. | June 21, 1921 |
| 1,665,728 | Canright | Apr. 10, 1928 |
| 1,695,347 | Rousseas | Dec. 18, 1928 |
| 1,709,657 | Clinton | Apr. 16, 1929 |
| 1,736,460 | Pistoni et al. | Nov. 19, 1929 |
| 1,804,795 | Lee | May 12, 1931 |
| 1,850,082 | Medin | Mar. 22, 1932 |
| 2,014,325 | Grilli | Sept. 10, 1935 |
| 2,077,564 | Heuser | Apr. 20, 1937 |
| 2,086,127 | Gordon et al. | July 6, 1937 |
| 2,139,881 | Comstock | Dec. 18, 1938 |
| 2,149,270 | Burgess | Mar. 7, 1939 |
| 2,167,236 | Gieseler | July 25, 1939 |
| 2,206,424 | Oyen | July 2, 1940 |
| 2,365,179 | Egedal | Dec. 19, 1944 |
| 2,381,965 | Berry | Aug. 14, 1945 |
| 2,392,452 | Baumann | Jan. 8, 1946 |
| 2,398,314 | Laereman | Apr. 9, 1946 |
| 2,447,692 | Evensen | Aug. 24, 1948 |
| 2,488,817 | Kaminky | Nov. 22, 1949 |

FOREIGN PATENTS

| | | |
|---|---|---|
| 20,505 | Great Britain | 1897 |